United States Patent
Prey et al.

(10) Patent No.: US 9,954,825 B2
(45) Date of Patent: Apr. 24, 2018

(54) SECURE VIRTUAL MACHINE

(71) Applicant: NTREPID CORPORATION, Herndon, VA (US)

(72) Inventors: Chad Prey, San Diego, CA (US); Alexander Ryzhak, San Diego, CA (US); Jeff Thompson, San Diego, CA (US); John Thompson, Chicago, IL (US); Bradley Rintoul, San Diego, CA (US); Adam Browning, Reston, VA (US); Michael E. Martinka, Vienna, VA (US); Darby Mullen, San Antonio, TX (US)

(73) Assignee: NTREPID CORPORATION, Herndon, VA (US)

( * ) Notice: Subject to any disclaimer, the term of this patent is extended or adjusted under 35 U.S.C. 154(b) by 149 days.

(21) Appl. No.: 15/072,092

(22) Filed: Mar. 16, 2016

(65) Prior Publication Data
US 2017/0272404 A1    Sep. 21, 2017

(51) Int. Cl.
*H04L 29/06* (2006.01)
*G06F 9/455* (2018.01)

(52) U.S. Cl.
CPC ...... *H04L 63/0272* (2013.01); *G06F 9/45533* (2013.01); *H04L 63/083* (2013.01)

(58) Field of Classification Search
CPC .......... H04L 63/0272; H04L 63/083; G06F 9/45533
USPC .................................... 726/15, 25
See application file for complete search history.

(56) References Cited

U.S. PATENT DOCUMENTS

| | | | | |
|---|---|---|---|---|
| 8,341,625 | B2* | 12/2012 | Ferris | G06F 9/45558 718/1 |
| 8,533,343 | B1* | 9/2013 | Beda, III | H04L 63/126 709/227 |
| 9,172,724 | B1* | 10/2015 | Reddy | H04L 63/20 |
| 9,251,372 | B1* | 2/2016 | Lahoz | G06F 21/6245 |
| 2006/0112188 | A1* | 5/2006 | Albanese | G06F 21/33 709/238 |
| 2007/0300220 | A1* | 12/2007 | Seliger | G06F 8/61 718/1 |
| 2009/0222815 | A1* | 9/2009 | Dake | G06F 9/455 718/1 |
| 2011/0214176 | A1* | 9/2011 | Burch | G06F 9/455 726/15 |
| 2012/0265976 | A1* | 10/2012 | Spiers | H04L 63/0218 713/2 |
| 2013/0219387 | A1* | 8/2013 | Moeller | G06F 9/4401 718/1 |

(Continued)

*Primary Examiner* — Michael S McNally
(74) *Attorney, Agent, or Firm* — Squire Patton Boggs (US) LLP

(57) ABSTRACT

Various embodiments pertain to computing devices and virtual machines. In particular, various embodiments relate to the start-up, operation, and communication of virtual machines. A method includes initiating operation of a virtual machine on a computing device, and sending a token from the computing device to a virtual machine, where the token is used to connect the computing device and the virtual machine. The method also includes establishing a virtual private network between the virtual machine and a network node using the token, and launching a user interface of the virtual machine on the computing device after the virtual private network has been established.

38 Claims, 9 Drawing Sheets

(56) References Cited

U.S. PATENT DOCUMENTS

| | | | |
|---|---|---|---|
| 2014/0280738 A1* | 9/2014 | Kolker | H04L 12/46 709/218 |
| 2014/0373126 A1* | 12/2014 | Hussain | H04L 63/08 726/9 |
| 2015/0074536 A1* | 3/2015 | Varadharajan | G06F 17/30233 715/734 |
| 2015/0188788 A1* | 7/2015 | Kolesnik | G06F 17/30569 709/224 |

* cited by examiner

SECURE VIRTUAL MACHINE

BACKGROUND

Field

Various embodiments pertain to computing devices and virtual machines. In particular, various embodiments relate to the start-up, operation, and communication of virtual machines.

Description of the Related Art

The ever increasing sharing of private user data in today's technological environments has created an increase need to employ various security mechanisms to ensure that the data being uploaded, downloaded, and communicated is protected. While secure communications are needed between two different users, or between two different computing devices, communications between a computing device and a virtual machine can also benefit from added security protections.

A virtual machine is an operating system installed on software. The software is designed to mimic dedicated hardware, and provide an operating system that appears to be identical to an operating system having dedicated hardware. While virtual machines are software based, not hardware based, virtual machines are launched on host computing devices that have dedicated hardware. There are many beneficial uses of virtual machines, including preventing computer viruses, testing software, creating a back-up of an entire operating system, and creating a personal cloud computer.

Current methods of launching a virtual machine on a computing device may create some security risks. For example, it may be possible for an attacker to escape the confines of the virtual machine and access the host computing device during the launching of the virtual machine in the host computing device. In addition, like other forms of internet based communication, there are security concerns about data being transferred between the virtual machine and the host computing device.

SUMMARY

According to certain embodiments, a method may include initiating operation of a virtual machine on a computing device, and sending a token from the computing device to the virtual machine. The token may be used to connect the computing device to the virtual machine. The method can also include establishing a virtual private network between the virtual machine and the network node using the token, and launching a user interface of the virtual machine on the computing device after the virtual private network has been established.

An apparatus, according to certain embodiments, may include at least one memory including computer program code, and at least one processor. The at least one memory and the computer program code are configured, with the at least one processor, to cause the apparatus at least to initiate operation of a virtual machine on a computing device, and send a token from the computing device to the virtual machine, wherein the token is used to connect the computing device to the virtual machine. The at least one memory and the computer program code are also configured, with the at least one processor, to cause the apparatus at least to establish a virtual private network between the virtual machine and the network node using the token, and launch a user interface of the virtual machine on the computing device after the virtual private network has been established.

According to certain embodiments, a non-transitory computer-readable medium encoding instructions that, when executed in hardware, perform a process. The process can include initiating operation of a virtual machine on a computing device, and sending a token from the computing device to the virtual machine, wherein the token is used to connect the computing device to the virtual machine. The process can also include establishing a virtual private network between the virtual machine and the network node using the token, and launching a user interface of the virtual machine on the computing device after the virtual private network has been established.

An apparatus, according to certain embodiments, may include means for initiating operation of a virtual machine on a computing device, and means for sending a token from the computing device to the virtual machine, wherein the token is used to connect the computing device to the virtual machine. The apparatus can also include means for establishing a virtual private network between the virtual machine and the network node using the token, and means for launching a user interface of the virtual machine on the computing device after the virtual private network has been established.

According to certain embodiments, a method may include receiving a token initiating operation of a virtual machine. The method can also include establishing a virtual private network between the virtual machine and a network node using the token before launching a user interface of the virtual machine on the computing device, and communicating with the virtual machine.

An apparatus includes, in certain embodiments, at least one memory comprising computer program code and at least one processor. The at least one memory and the computer program code are configured, with the at least one processor, to cause the apparatus at least to receive a token initiating operation of a virtual machine. The at least one memory and the computer program code are configured, with the at least one processor, to also cause the apparatus at least to establish a virtual private network between the virtual machine and a network node using the token before launching a user interface of the virtual machine on the computing device, and communicating with the virtual machine.

According to certain embodiments, a non-transitory computer-readable medium encoding instructions that, when executed in hardware, perform a process. The process can include receiving a token initiating operation of a virtual machine. The process can also include establishing a virtual private network between the virtual machine and a network node using the token before launching a user interface of the virtual machine on the computing device, and communicating with the virtual machine.

An apparatus, in certain embodiments, may include means for receiving a token initiating operation of a virtual machine. The apparatus can also include means for establishing a virtual private network between the virtual machine and a network node using the token before launching a user interface of the virtual machine on the computing device, and means for communicating with the virtual machine.

DETAILED DESCRIPTION

A secure method of launching a virtual machine on a computing device can provide various benefits. In certain embodiments, a secure connection between the host computing device and the virtual machine would automatically be established upon initiating operation of the virtual machine. Further, in certain embodiments it may be beneficial to prevent the user from accessing the virtual machine until after the secure connection has been established.

In other embodiments, it may be helpful to create a secure connection to allow the virtual machine to transmit data files to the hosting computing device. In doing so, certain embodiments may utilize cloud technology to help facilitate this transfer of data. For example, a cloud storage system may act as an intermediary between the virtual machine and the memory of the host computing device.

Figure 1:
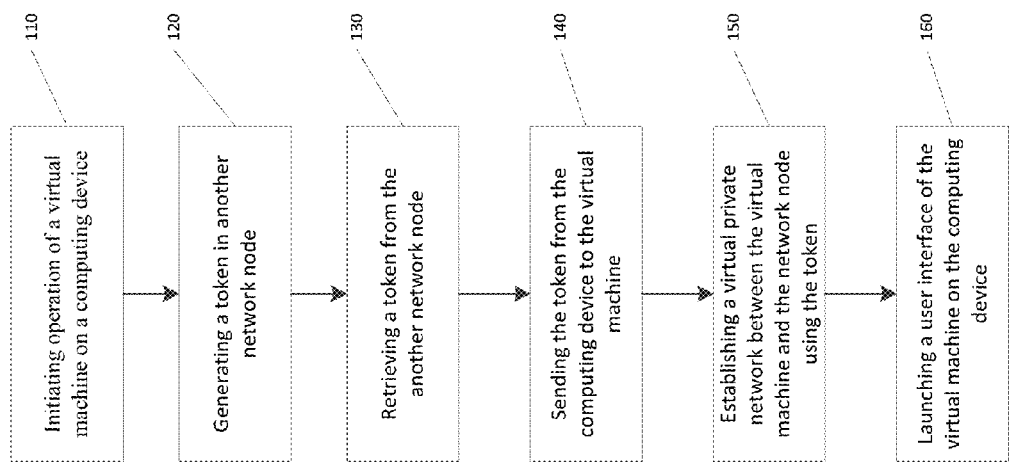
FIG. 1 illustrates a flow diagram of a method according to certain embodiments.

FIG. 1 illustrates a flow diagram of a method according to certain embodiments. In step 110, the operation of a virtual machine may be initiated on a computing device. The computing device may be any combination of hardware that includes at least a processor, a memory, a transceiver, or any other hardware used for the processes describes herein. For example, the computing device may be a computer, a tablet, a mobile phone, such as a smart phone, or multimedia device.

The virtual machine can be operated in a virtual desktop or on a local desktop of the host computing device. In certain embodiments, the user desktop of the host computer and the virtual machine may be different instances on a virtual device interface server. While a virtual machine runs on software that mimics dedicated hardware, the software used for the virtual machine is run on a server of the host computing device. To initiate operation of a virtual machine, a user can manually choose to activate the virtual machine. In other embodiments, no user input is required, and the virtual machine is initiated automatically during the setup process of the operating system of the host computing device. In certain embodiments, before the user is able to use the virtual machine, it may be important to ensure that the connection between the virtual machine and the network node, to which the virtual machine is connected, is secure.

A network node, to which the virtual machine is connected, may be located in any computer, wireless, or communications network, to which the host computing device belongs. A network node can be an access point, a server, a host or any of the other network nodes located in the network or in the cloud storage system. In some embodiments, the virtual machine may connect to a network to which the host computing device does not belong, meaning that the only connection between the virtual machine and the host computing device is the server on which the software of the virtual machine is run. In some embodiments, the network node may be located in a cloud storage system.

To ensure the secure connection between the virtual machine and the network node, a security token may be utilized. In step 120, a security token is generated in another network node, such as a back-end server. Once the security token is generated, the virtual machine will connect to a host-side application, which will help facilitate communication between the back-end server, which will provide the token, and the virtual machine. In other words the application acts to launch the virtual machine and communicates to it the token required to establish the virtual private network (VPN).

In some embodiments, the application also handles other communications between the host environment and the virtual machine, through the network node and VPN, once the VPN has been established. In some other embodiments, once the virtual machine is launched the host-side application does not communicate directly with the virtual machine again. The virtual machine then only communicates with the network node.

The host-side application may also send at least one uniform resource locator (URL) to and from the virtual machine, which may be used to retrieve the token. In other embodiments, the URL may be send to the virtual machine via the network node. In some embodiments, before the VPN is established, the host side-application is able to send data using the URL which might be needed for the virtual machine to properly configure itself and to create the VPN connection to the network node. Once the VPN connection is established, however, the host-side application handles all communications between the virtual machine and the host environment. This includes, for example, clicked URLs, information about files to be uploaded or downloaded, and various other functions.

In some embodiments, instead of a back-end server, any other network node that is capable of communicating with a virtual machine may be used. A handshake is then undertaken between the back-end server and the virtual machine. In step 130, the back-end server retrieves the token that will be used to connect the virtual machine to the desired network node.

The token may be any type of authentication token, cryptographic token, or software token that may be capable of securely providing the virtual machine with the necessary information to connect the virtual machine to the desired network node. In certain embodiments, the token may be a short term token, which can mean that the token lasts for a short time period. Alternatively, the token may be a single use token that can only be used once. In other embodiments, the token may be random, and may not contain any user identifying information. Once retrieved, the token may be sent from the computing device to the virtual machine, as described in step 140. Upon receiving the token, the virtual machine can establish a dynamic VPN between the virtual machine and a network node.

A VPN may be constructed by establishing a private network across the available public network. Some of the main uses of a VPN include maintaining data confidentiality, data integrity, and authentication. To do so, VPN uses techniques such as encryption algorithms, hash values, and various authentication methods, including passwords, digital certificates, and tokens. Both site to site and/or remote access VPNs may be used.

In step 150, the VPN is established between the virtual machine and the desired network node using the token retrieved in step 130. In some embodiments, the process of initiating the virtual machine, generating, retrieving, and sending and token, as well as establishing the VPN is automatic. In this embodiment no input or action from the user is needed to establish the VPN.

In some embodiments, the VPN is the only network data path to and from the virtual machine. Firewalls can be enacted inside the virtual machine to ensure that no other communication routes other than the VPN are available. The firewall, for example, can be a network layer or application layer firewall, which monitors and controls the incoming or outgoing network traffic based on security regulations. The regulations may be either predetermined by the user, or may be default security regulations enacted by the base software of the virtual machine.

Once the VPN is established, the user interface of the virtual machine is launched on the computing device. Up until now, the user may have been unable to access the virtual machine. The user may now have access to the virtual machine, which has been launched in a secure manner. Inside the virtual machine, the user may access or run any available protected application. A protected application can be any application run on the secure virtual machine, which has been initiated by the process described in steps 110-160 of FIG. 1. Both the user and the protected applications benefit from this secure virtual machine environment.

Figure 2:
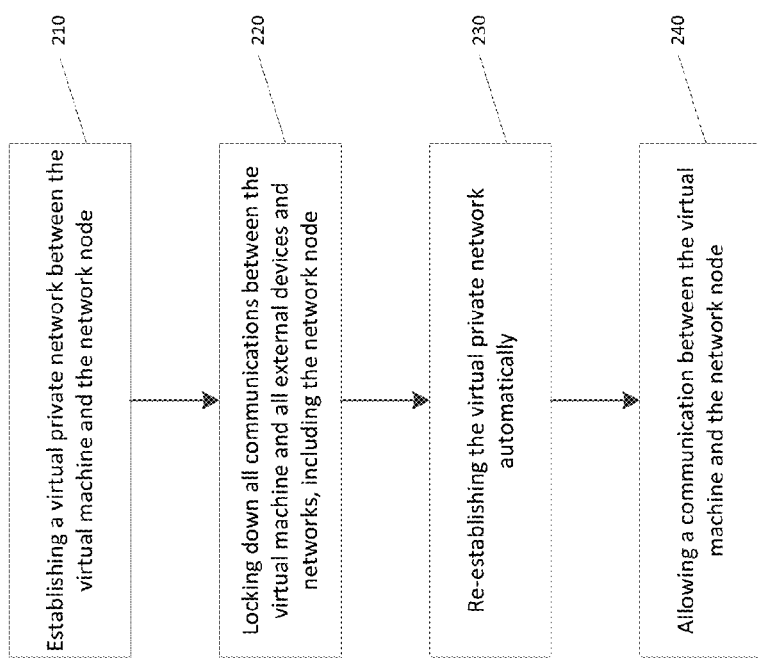
FIG. 2 illustrates a flow diagram of a method according to certain embodiments.

FIG. 2 illustrates a flow diagram of a method according to certain embodiments. In step 210, the VPN is established to allow communication between the virtual machine and the network node. As previously discussed, the VPN can be the only network data path to and from the virtual machine. In some embodiments, a failsafe feature may be included that automatically locks down at least some of the communications to and from the virtual machine if the VPN is dropped or is disturbed, as described in step 220. In other words, in certain embodiments, if the VPN drops, all communication channels between the virtual machine and all external devices and network will cease, including the network node. The virtual machine will no longer be able to communicate until the VPN is re-established.

In certain embodiments the lock down may be similar, for example, to a computer losing the ability to connect to the internet. While the current page uploaded on the web browser of the computer may still be displayed, the computing device cannot send or receive any data until the internet communication is restored. In other embodiments, when the VPN is dropped the user interface of the virtual machine will disappear, preventing the user from having any access to the virtual machine. This embodiment provides additional security, to ensure that the user does not provide any sensitive data after a possible compromise of the virtual machine. Alternatively, the user interface may be automatically changed to a "logged-off" screen, which will automatically disappear upon the re-establishing of the VPN.

Once the VPN connection is dropped or disconnected, the failsafe will automatically lock down the communications to and from the virtual machine. The VPN connection can be disconnected for a variety of reasons, including inadequate signal strength, network congestion, high network latency, or a misconfigured firewall. In other embodiments, the VPN may be dropped or disconnected for any other reason, which will automatically trigger the failsafe lock down feature.

Once the failsafe is initiated, either the virtual machine or the network node can attempt to re-establish the VPN. In re-establishing the VPN, the virtual machine and/or the network node may undergo the same process as describes in steps 120-150 of FIG. 1. The virtual machine and/or the network node can therefore utilize the host-side application to help retreat a token, which has been generated in another network node, for example, a back-end server, and send the token to the desired network node. In some embodiments, the token can be generated or negotiated using in an algorithm. The VPN can then be re-established. In certain embodiments the firewall and routing rules for the re-established VPN may be the same at the original VPN. Alternatively, new firewall and routing rules may be set, either by the user or by a set of predetermined rules, for the re-established VPN. In some embodiments, a set of predetermined rules will set the firewall and routing rules, without the user having the ability to do so.

In other embodiments, a new token may not be needed, and the same token used to establish the original VPN can be used to re-establish the VPN. In some other embodiments, an additional security measure can be enabled in which the token may expire after a certain amount of time. Upon expiration of the token, the VPN may be dropped, and the virtual machine and the network node can undergo the same process as describes in steps 120-150 of FIG. 1.

In step 240, once the VPN has been re-established, and the network data path restored, the virtual machine can again begin to communicate with all external devices and networks, including the desired network node in a secure manner.

Figure 3:
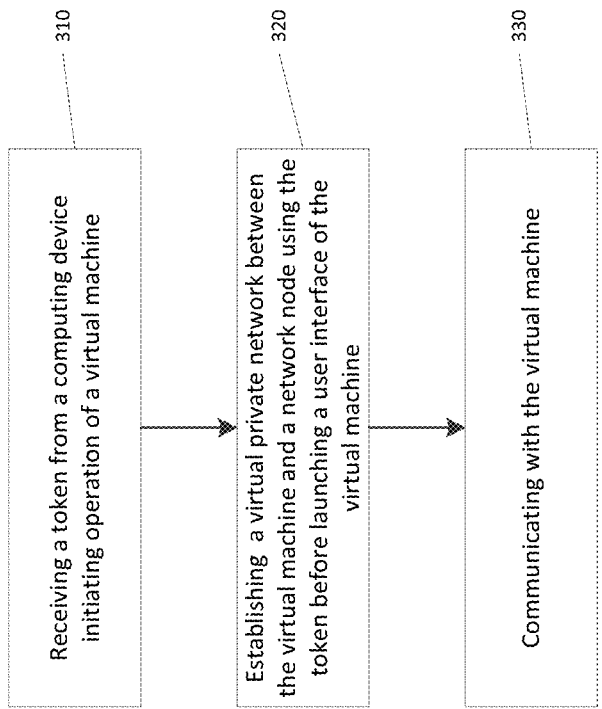
FIG. 3 illustrates a flow diagram of a method according to certain embodiments.

FIG. 3 illustrates a flow diagram of a method according to certain embodiments. In certain embodiments, FIG. 3 represents a method that may be performed by the network node. In step 310, the desired network node receives a token from either the virtual machine or the host computing device. The network node can then use the token to establish a VPN between the virtual machine and a network node before launching the user interface of the virtual machine, as shown in step 320. Once the VPN is established, the network node can begin to communicate with the virtual machine on the network data path provided by the VPN, as shown in step 330.

Figure 4:
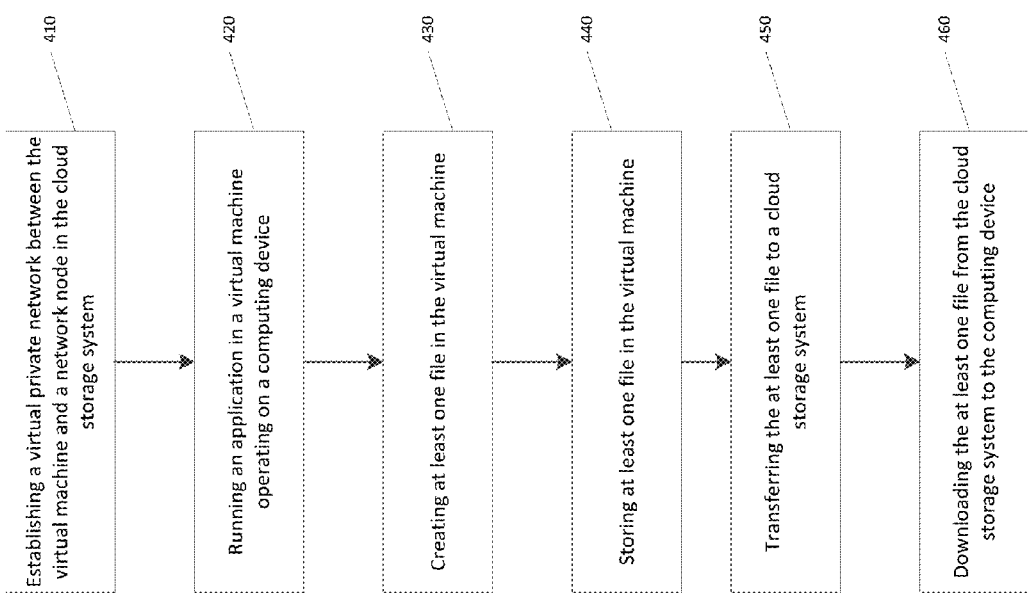
FIG. 4 illustrates a flow diagram of a method according to certain embodiments.

FIG. 4 illustrates a flow diagram of a method according to certain embodiments. When transmitting applications and/or data files from the virtual machine to the hosting computing device, it may be helpful to utilize a cloud storage system to aid in the transmission. In doing so, however, there may be a number of security risks involved. For example, if the cloud server is public, the shared infrastructure between the cloud server and the virtual machine may be susceptible to data breaches. Certain embodiments provide a safe, secure method and apparatus of transferring files from the virtual machine to the host computing device via a cloud based storage system.

In certain embodiments, a virtual machine can run either in a virtual desktop or in a local desktop of a computing device. In certain embodiments, the user desktop of the host computer and the virtual machine may be different instances on a virtual device interface server. In step 410, a VPN can be established between the virtual machine and a desired network node located in the cloud storage system. Alternatively, establishing the VPN can occur at any time, as long as the VPN is established before the transmission of data between the virtual machine and the cloud based storage system. The desired network node in the cloud storage system may be predetermined by the user. This may involve having to manually enter information related to the desired network node before establishing the VPN. Alternatively, the base software of the virtual machine may already include information about the desired network node. In this embodiment, establishing the VPN will require no input from the user, and will automatically form.

When a protected application is run on the virtual machine, as shown in step 420, the application may create a data file in step 430. In some embodiment, instead of creating a file, the application may download a file from the Internet, for example. Once the file has been created, a user of the virtual machine may want to store the file outside the virtual machine, either in the cloud or in the host computing device. In step 440, the file is stored in the virtual machine. Because the virtual machine does not have any dedicated hardware, storing data files in the virtual machine will involve occupying some of the memory of the host computing device. In certain embodiments, the file may only be temporarily stored in the virtual machine, before being transferred to the cloud storage system. This allows the virtual machine to conserve the memory of the hosting computer device. In other embodiments, the file may be stored in a remote network drive, without ever being stored in the virtual machine.

Once at least one file is created or downloaded by a protected application on the virtual machine, the at least one file may then be transferred to a cloud storage system, as shown in step 450. In some embodiments, a VPN between the virtual machine and a network node in the cloud storage system has already been established. The VPN is used to securely transmit the at least one file from the virtual machine to the cloud storage system. In some embodiments, the files can also be retrieved from other computers using the host-side application, or from any computer with access using a browser, or any other tool.

The VPN can be utilized to help automatically transfer some or all of the at least one file in the virtual machine to the cloud storage system. In this embodiment, no user interaction is needed. In some embodiments the storing of at least one file to the virtual machine can be automatically detected, and then automatic transmission can be initiated to the cloud storage system. In certain embodiments, at least some of the files saved in the virtual machine can be saved in a directory. This directory can then be automatically synchronized with the network node in the cloud storage system. In other embodiments, the at least one file may be transferred to the cloud storage system in real time, so that no synchronization may be needed after the at least one file is downloaded.

For example, if a web browser application is used in the virtual machine, and a user wishes to save a particular web page in pdf format, the user simply needs to simply create the file and save it to the directory. Once the pdf file is saved in the directory, it will automatically be transmitted through the VPN to the cloud storage system, which will keep a copy of the saved file. Alternatively, upon sending the file to the cloud storage system the file may be deleted from the directory of the virtual machine.

In some embodiments, the entire virtual machine may be considered the directory. If a user were to save a file to any location on the virtual machine, that file will be transmitted to the cloud storage system. For example, if a web browser application is used in the virtual machine, the user may mark a page in the web browser as a "favorite." Because that marked page will be saved in a file on the virtual machine, regardless of which file, it will be considered saved in the directory and automatically transmitted to the cloud storage system. In certain embodiments, the saved directory can be remotely mounted from a server, such as a local downloads directory. In other embodiments, a network file system can be used to mount a directory on the cloud server over the VPN.

While the directory allows for automatic transmission of files, a user may also manually select which files they would like to transmit to the cloud storage system.

Once the information is in the cloud storage system, the host-side application can help catalog the data. In other embodiments, the cloud system can do so without the use of the host-side application. Data may be grouped or organized according to date, time, size, or importance. In some embodiments, the data in the cloud storage system may be ordered to mimic the organization of the virtual machine. For example, if a certain file was stored in the virtual machine in a folder titled "documents," then that same file will also be stored in the cloud storage system in a file labeled "documents."

From the cloud storage system, the at least one file may be manually downloaded by a user of the host computing device. This manual download may make it difficult for attackers to hack the browser or trick the use to download a malicious file. In other words, by allowing the using to manually initiate the download we are making sure that the user actually wants that file. In other embodiments, a user may choose to download the at least one file to another computing device, which is separate from the host computing device. Alternatively, the at least one files may be automatically downloaded from the cloud storage system to the computing device, without requiring a user to select the particular file they wish to download. The desired computing device may be predetermined by the cloud storage system. In other embodiments, the at least one files may contain information identifying the computing device to which they wish the file to be downloaded.

In certain embodiments, a user may want to save a file on the computing device to the virtual machine. In this embodiment, a file saved on the computing device will be transmitted to the cloud storage system, and subsequently downloaded, either manually or automatically, to the virtual machine.

Figure 5:
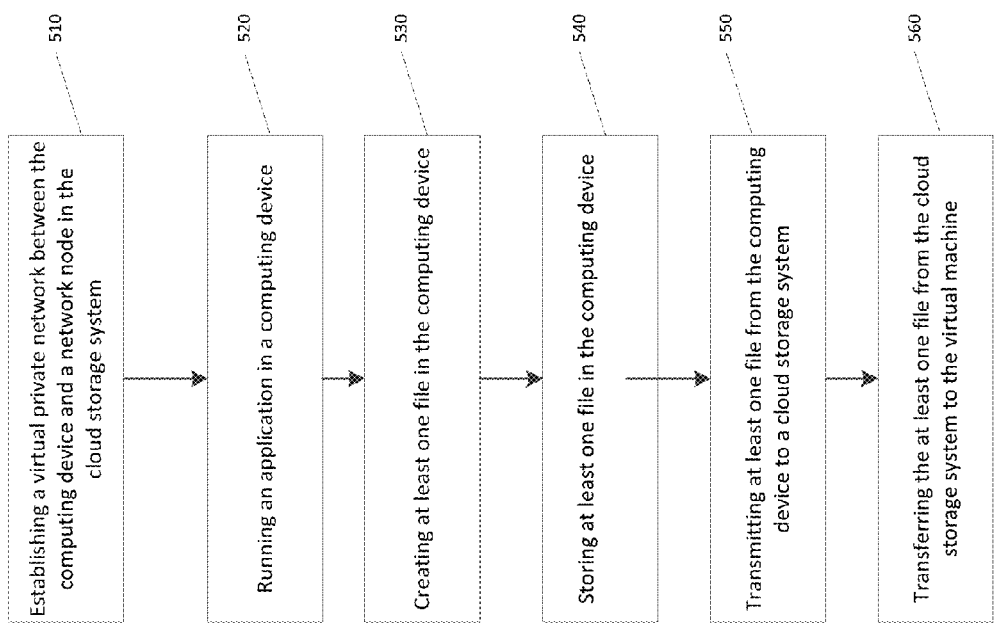
FIG. 5 illustrates a flow diagram of a method according to certain embodiments.

FIG. 5 illustrates a flow diagram of a method according to certain embodiments. In step 510, a VPN is established between the computing device and a network node in the cloud storage system. The VPN may automatically be established, as outlined in the steps 120-150 in FIG. 1. In other embodiments, the VPN can be established any time before the transmission of the at least one file from the computing device to the cloud storage system, in step 540.

In step 520, an application is run on the computing device, and in step 530 at least one file is created. The application either creates the at least one file, or the file may be downloaded from another location, such as the internet for example. In step 540, the at least one file is stored in the computing device. In some embodiments the at least one file may be temporarily stored until transmission of the at least one file is completed, at which point the file will be deleted from the computing device. Once stored, the file is transmitted in step 550 via the VPN to the cloud storage system. The at least one file may then be transferred from the cloud storage system to the virtual machine, in step 560.

The transfer of the at least one file from the cloud storage system to the computing device may be automatic or manual. Communications between the virtual machine and the network node are managed automatically within the virtual machine. In fact, in some embodiments the network file system mount passively and automatically transfers files.

Figure 6:
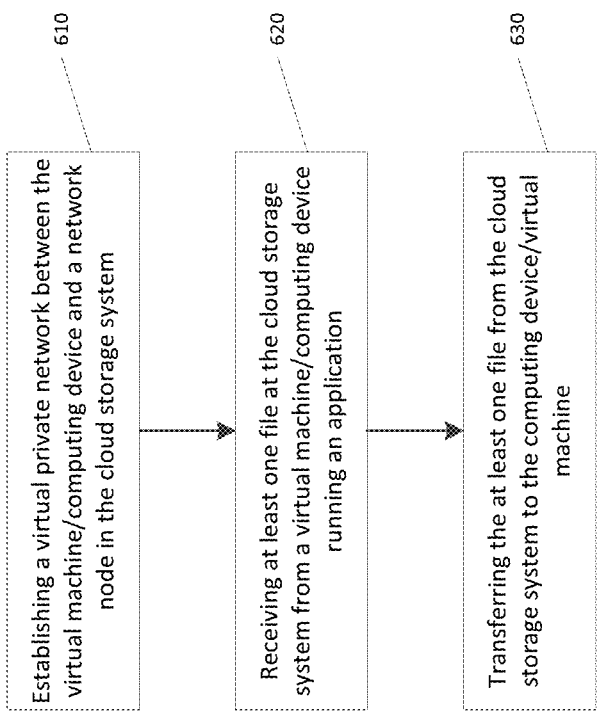
FIG. 6 illustrates a flow diagram of a method according to certain embodiments.

FIG. 6 illustrates a flow diagram of a method according to certain embodiments. In step 610, a VPN is established between the virtual machine or the computing device and a network node in the cloud storage system. In step 620, the cloud storage system receives at least one file via the VPN from the virtual machine or the computing device. One received, the cloud storage system can then transfer in step 630 the at least one file to either the computing device or the virtual machine. The transfer may be automatic or manual, as described above. In addition a host-side application may help to facilitate this transfer from the cloud storage system to the computing device.

Figure 7:
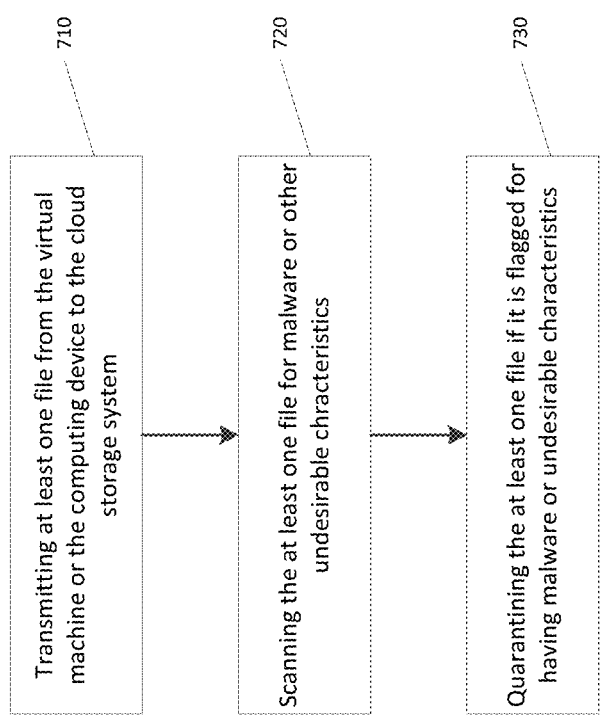
FIG. 7 illustrates a flow diagram of a method according to certain embodiments.

Additional security features may be used in certain embodiments to further ensure the security of the virtual machine and/or the computing device. FIG. 7 illustrates a flow diagram of a method according to certain embodiments. In step 710, the at least one file is transmitted from either the virtual machine or the computing device to the cloud storage. Once the at least one file is in the cloud storage system, the at least one file may be scanned for malware or other undesirable characteristics in step 720.

The scanning can be conducted by any third party security software that is capable of detecting malware, viruses, or any other undesirable characteristic. The scanning can be performed before the at least one file is then transmitted from the cloud storage system to the virtual machine or the computing device, thus ensuring that harmful files may not be sent from the cloud storage system. Scanning the files in the cloud storage system, and away from the virtual machine and computing device, provides the added benefit of containing the malware to the cloud, rather than transporting that malware to the operating system of the computing device or to the virtual machine.

During scanning, the third party protection software may flag at least one file which contains malware or any other undesirable characteristic. The undesirable may be predetermined by the third party security software, or may be predetermined by a user. Once flagged, the at least one file may then be quarantined in step 730. In some embodiments, the source of the quarantined file may be traced and quarantined as well. For example, if a file downloaded from a specific website has been quarantined, the website from which the file was downloaded may be detected, and all other files downloaded from that same website can be quarantined as well.

Quarantined files are not included in the normal download directory of the cloud storage system. Rather, the files are removed and placed in a separate location on the cloud storage system to which users have no access. As such, the quarantined files may not be downloaded to the virtual machine or the computing device. In some embodiments, users who have been granted special access may be able to access the quarantined files, and remove them from the quarantined files list.

Figure 8:
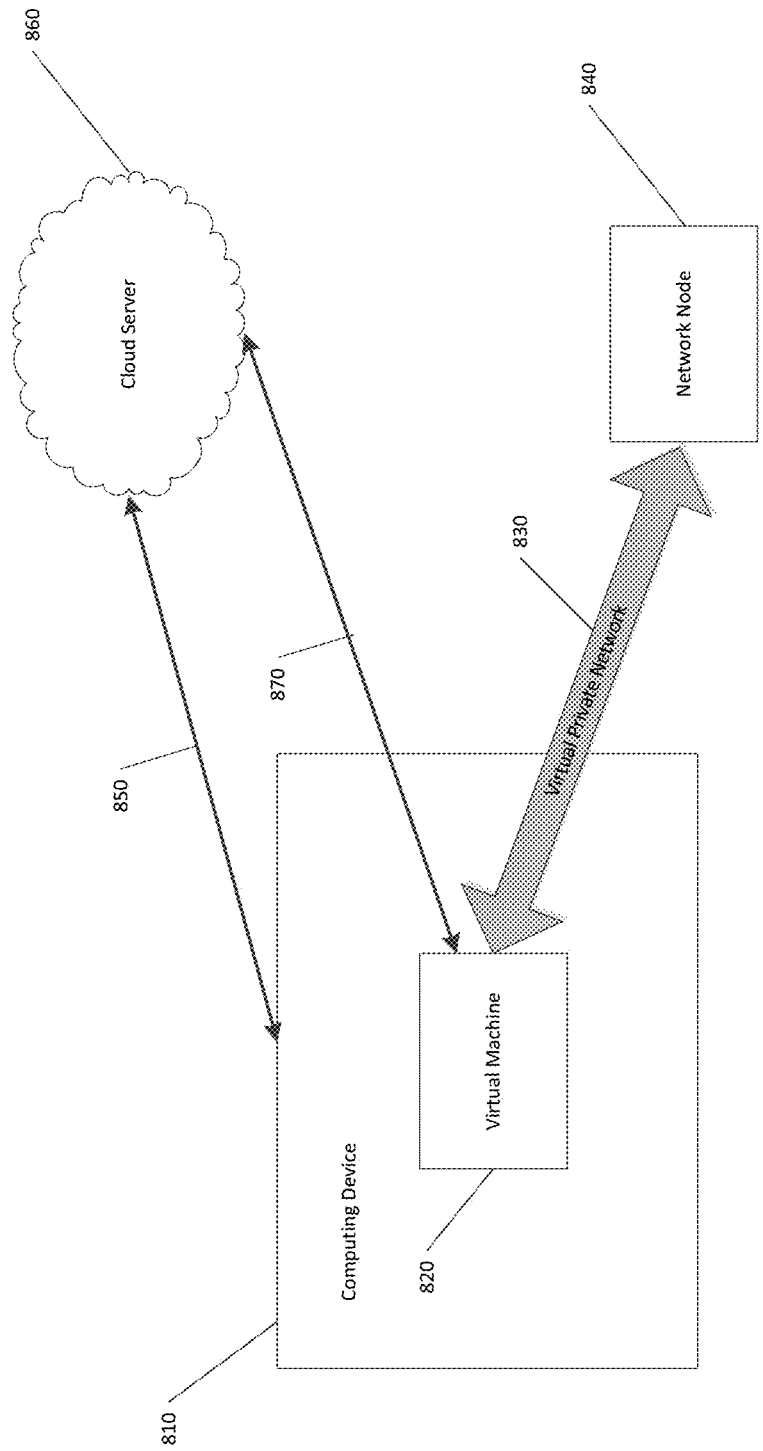
FIG. 8 illustrates a system diagram according to certain embodiments.

FIG. 8 illustrates a system diagram according to certain embodiments. In the embodiment shown in FIG. 8, Virtual machine 820 can be located in computing device 810. A token may then be sent from computing device 810 to virtual machine 820. Virtual machine 820 can then use this token to establish a virtual private network 830 with network node 840, which will allow the virtual machine to securely connect to the internet.

FIG. 8 also illustrates that cloud server 860 may also be included in certain embodiments. A data file created on virtual machine 820, operating on computing device 810, may be transmitted to cloud server 860, as shown in step 870. As shown in step 850, the cloud server 860 can then transfer the received data file to computing device 810. In some other embodiments, a data file created in computing device 810 may be transmitted to cloud server 860, as shown in step 850. As shown in step 870, cloud server 860 can then transfer the received data file to virtual machine 820, operating on computing device 810.

Figure 9:
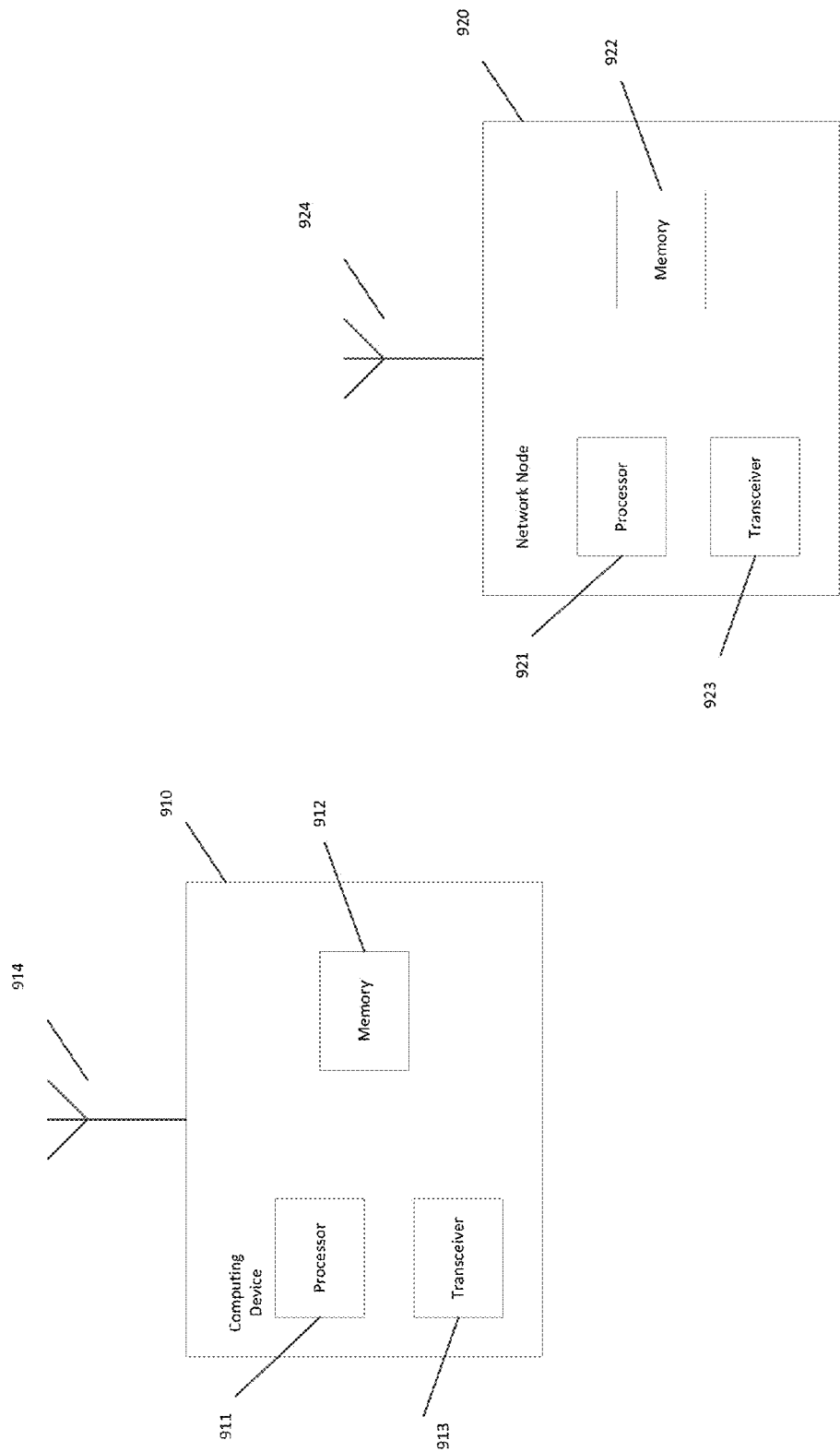
FIG. 9 illustrates a system according to certain embodiments.

FIG. 9 illustrates a system according to certain embodiments. It should be understood that each block of the flowchart of FIGS. 1, 2, 3, 4, 5, 6, and 7 and any combination thereof, may be implemented by various means or their combinations, such as hardware, software, firmware, one or more processors and/or circuitry. In one embodiment, a system may include several devices, such as, for example, network node 920 and computing device 910. The system may include more than one computing 910 and more than one network node 920, although only one of each is shown for the purposes of illustration. A network node can be an access point, a server, a host or any of the other network nodes located in the network or in the cloud storage system.

Each of these devices may include at least one processor or control unit or module, respectively indicated as 921 and 911. Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

At least one memory may be provided in each device, and indicated as 912 and 922, respectively. Memories 912 and 922 may independently be any suitable storage device, such as a non-transitory computer-readable medium. A hard disk drive (HDD), random access memory (RAM), flash memory, or other suitable memory may be used. The memory may include computer program instructions or computer code contained therein. One or more transceiver 923 and 913 may be provided, and each device may also include an antenna, respectively illustrated as 924 and 914. Although only one antenna each is shown, many antennas and multiple antenna elements may be provided to each of the devices. Other configurations of these devices, for example, may be provided. For example, network node 920 and computing device 910 may be additionally configured for wired communication, in addition to wireless communication, and in such a case antennas 924 and 914 may illustrate any form of communication hardware, without being limited to merely an antenna.

Transceivers 923 and 913 may each, independently, be a transmitter, a receiver, or both a transmitter and a receiver, or a unit or device that may be configured both for transmission and reception. The operations and functionalities may be performed in different entities, such as nodes, hosts or servers, in a flexible manner. In other words, division of labor may vary case by case. For example, the virtual machine may be implemented in software that can run on a server.

A computing device 910 may be any combination of hardware that includes at least a processor and a memory. For example, the computing device may be a computer, a tablet, a mobile phone, such as a smart phone, or multimedia device. In some embodiment the computing device may be provided with wireless capabilities.

In some embodiment, an apparatus, such as a node or computing device, may include means for carrying out embodiments described above in relation to FIGS. 1, 2, 3, 4, 5, 6, and 7. In certain embodiments, at least one memory including computer program code can be configured to, with the at least one processor, cause the apparatus at least to perform any of the processes described herein.

According to certain embodiments, an apparatus may include at least one memory 912 including computer program code, and at least one processor 911. The at least one memory 912 and the computer program code are configured, with the at least one processor 911, to cause the apparatus at least to initiate operation of a virtual machine on a computing device, and send via transceiver 913 a token from the computing device 910 to a virtual machine 920, where the token is used to connect the computing device and the virtual machine. The at least one memory 912 and the computer program code are also configured, with the at least one processor 911, to cause the apparatus at least to establish a virtual private network between the virtual machine and the network node 920 using the token, and launch a user interface of the virtual machine on the computing device 910 after the virtual private network has been established.

In certain embodiments, an apparatus includes at least one memory 922 comprising computer program code and at least one processor 921. The at least one memory 922 and the computer program code are configured, with the at least one processor 921, to cause the apparatus at least to receive via a transceiver 923 a token initiating operation of a virtual machine. The at least one memory 922 and the computer program code are configured, with the at least one processor 921, to also cause the apparatus at least to establish a virtual private network between the virtual machine and a network node 920 using the token before displaying a user interface to the virtual machine on the computing device 910, and communicating with the virtual machine.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 920 and/or UE 910, to perform any of the processes described above (see, for example, FIGS. 1, 2, 3, 4, 5, 6, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a network node 920 and a computing device 910, certain embodiments may be applicable to other configurations, and configurations involving additional elements, as illustrated and discussed herein. For example, multiple computing devices and multiple network nodes may be present.

The embodiments described above entail an improvement to the technical field at hand. For example, certain embodiments help to securely launch a virtual machine in a computing device with use of a VPN. A host-side application can be used to efficiently facilitate the automatic establishment of the VPN. Other embodiments allow for the secure transmission of files between a computing device and a virtual machine with use of a cloud storage system. Additional security measures can also be added in the cloud storage system that will allow for the scanning of files for malware and other undesirable characteristics.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   initiating operation of a virtual machine on a computing device, wherein a user cannot access a user interface of the virtual machine until after a virtual private network is established;
   sending a token from the computing device to the virtual machine, wherein the token is used to connect the computing device to the virtual machine;
   establishing the virtual private network between the virtual machine and a network node using the token; and
   launching the user interface of the virtual machine on the computing device after the virtual private network has been established.

2. The method according to claim 1, wherein the token is configured for at least a short term or a single use.

3. The method according to claim 1, wherein the token is random and does not include any user identifying information.

4. The method according to claim 1, further comprising: generating the token in another network node.

5. The method according to claim 4, further comprising: retrieving the token with a host-side application.

6. The method according to claim 5, wherein the host-side application communicates with the virtual machine.

7. The method according to claim 6, wherein the host-side application sends at least one uniform resource locator to the virtual machine.

8. The method according to claim 7, wherein the uniform resource locator is sent to the virtual machine via the network node.

9. The method according to claim 1, further comprising: generating the token in the computing device with the use of an algorithm.

10. The method according to claim 1, wherein establishing the virtual private network is automatic.

11. The method according to claim 1, wherein the virtual private network is the only network data path into the virtual machine and out of the virtual machine.

12. The method according to claim 1, further comprising: locking down all communications between the virtual machine and all external devices and networks if the virtual private network is disrupted or dropped.

13. The method according to claim 1, further comprising: re-establishing the virtual private network automatically if the virtual private network drops.

14. The method according to claim 1, wherein a user desktop on the computing device and the virtual machine are different instances on a virtual device interface server.

15. An apparatus comprising:
at least one memory comprising computer program code;
at least one processor;
wherein the at least one memory and the computer program code are configured, with the at least one processor, to cause the apparatus at least to:
initiate operation of a virtual machine on a computing device, wherein a user cannot access a user interface of the virtual machine until after a virtual private network is established;
send a token from the computing device to the virtual machine, wherein the token is used to connect the computing device to the virtual machine;
establish the virtual private network between the virtual machine and a network node using the token; and
launch the user interface of the virtual machine on the computing device after the virtual private network has been established.

16. The apparatus according to claim 15, wherein the at least one memory and the computer program code are configured, with the at least one processor, to cause the apparatus at least to:
generate the token in another network node.

17. The apparatus according to claim 15, wherein the at least one memory and the computer program code are configured, with the at least one processor, to cause the apparatus at least to:
generate the token in the computing device with the use of an algorithm.

18. The apparatus according to claim 15, wherein the at least one memory and the computer program code are configured, with the at least one processor, to cause the apparatus at least to:
retrieve the token with a host-side application.

19. The apparatus according to claim 15, wherein establishing the virtual private network is automatic.

20. The apparatus according to claim 15, wherein the virtual private network is the only network data path into the virtual machine and out of the virtual machine.

21. The apparatus according to claim 15, further comprising:
locking down all communications between the virtual machine and all external devices and networks, including the network node, if the virtual private network is disrupted or dropped.

22. The apparatus according to claim 15, wherein the at least one memory and the computer program code are configured, with the at least one processor, to cause the apparatus at least to:
re-establish the virtual private network automatically if the virtual private network drops.

23. The method according to claim 15, wherein a user desktop on the computing device and the virtual machine are different instances on a virtual device interface server.

24. A method comprising:
receiving a token initiating operation of a virtual machine, wherein a user cannot access a user interface of the virtual machine until after a virtual private network is established;
establishing the virtual private network between the virtual machine and a network node using the token before displaying the user interface to the virtual machine on the computing device; and
communicating with the virtual machine.

25. The method according to claim 24, wherein the token is retrieved from another network node by the computing device.

26. The method according to claim 24, wherein a host-side application is used to generate the token.

27. The method according to claim 24, wherein establishing the virtual private network is automatic.

28. The method according to claim 24, wherein the virtual private network is the only network data path into the virtual machine and out of the virtual machine.

29. The method according to claim 24, further comprising:
locking down all communications between the virtual machine and all external devices and networks, including the network node, if the virtual private network is disrupted or dropped.

30. The method according to claim 24, further comprising:
re-establishing the virtual private network automatically if the virtual private network is disrupted.

31. An apparatus comprising:
at least one memory comprising computer program code;
at least one processor;
wherein the at least one memory and the computer program code are configured, with the at least one processor, to cause the apparatus at least to:
receive a token initiating operation of a virtual machine, wherein a user cannot access a user interface of the virtual machine until after a virtual private network is established;
establish the virtual private network between the virtual machine and a network node using the token before displaying the user interface to the virtual machine on the computing device; and
communicate with the virtual machine.

32. The apparatus according to claim 31, wherein the token is retrieved from another network node by the computing device.

33. The apparatus according to claim 31, wherein a host-side application is used to generate the token.

34. The apparatus according to claim 31, wherein the computing device uses an algorithm to generate the token.

35. The apparatus according to claim 31, wherein establishing the virtual private network is automatic.

36. The apparatus according to claim 31, wherein the virtual private network is the only network data path into the virtual machine and out of the virtual machine.

37. The apparatus according to claim 31, wherein the at least one memory and the computer program code are configured, with the at least one processor, to cause the apparatus at least to:
  lock down all communications between the virtual machine and all external devices and networks, including the network node, if the virtual private network is disrupted or dropped.

38. The apparatus according to claim 31, wherein the at least one memory and the computer program code are configured, with the at least one processor, to cause the apparatus at least to:
  re-establish the virtual private network automatically if the virtual private network is disrupted.

* * * * *